(12) United States Patent
Jarvis

(10) Patent No.: US 10,798,995 B2
(45) Date of Patent: Oct. 13, 2020

(54) ARTICLES AND METHODS OF MANUFACTURE OF ARTICLES

(71) Applicant: NIKE, Inc., Beaverton, OR (US)

(72) Inventor: Kelly B. Jarvis, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 17 days.

(21) Appl. No.: 15/888,304

(22) Filed: Feb. 5, 2018

(65) Prior Publication Data

US 2018/0235317 A1  Aug. 23, 2018

Related U.S. Application Data

(60) Continuation of application No. 13/357,727, filed on Jan. 25, 2012, now Pat. No. 9,883,717, which is a
(Continued)

(51) Int. Cl.
*A43B 13/41* (2006.01)
*B29C 64/153* (2017.01)
(Continued)

(52) U.S. Cl.
CPC ............ *A43B 13/41* (2013.01); *A43B 1/0027* (2013.01); *A43B 23/0235* (2013.01);
(Continued)

(58) Field of Classification Search
CPC ... A43B 13/41; A43B 23/0235; A43B 1/0027; A43B 13/122; A43B 13/125;
(Continued)

(56) References Cited

U.S. PATENT DOCUMENTS

| 1,800,406 A | 4/1931 | Rice |
| 1,887,026 A | 11/1932 | Lach |

(Continued)

FOREIGN PATENT DOCUMENTS

| AU | 2008-207351 A1 | 3/2009 |
| CN | 2048682 U | 12/1989 |

(Continued)

OTHER PUBLICATIONS

Search Report for European patent application No. 12194208.0 dated Feb. 1, 2013.
(Continued)

*Primary Examiner* — Hiwot E Tefera
(74) *Attorney, Agent, or Firm* — Banner & Witcoff, Ltd.

(57) ABSTRACT

Various articles, such as footwear, apparel, athletic equipment, watchbands, and the like, and methods of forming those articles are presented. The articles are generally formed, in whole or in part, using rapid manufacturing techniques, such as laser sintering, stereolithography, solid deposition modeling, and the like. The use of rapid manufacturing allows for relatively economical and time efficient manufacture of customized articles. The articles may include one or more reinforcements configured to provide added durability to various regions of the articles. In addition, the articles may be formed from two or more materials in a single rapid manufacturing process. The rapid manufacturing additive fabrication technique may also include using of varying intensities of the laser to fuse material to form the articles.

21 Claims, 7 Drawing Sheets

Related U.S. Application Data division of application No. 12/433,109, filed on Apr. 30, 2009, now Pat. No. 9,788,603, which is a continuation-in-part of application No. 12/255,496, filed on Oct. 21, 2008, now Pat. No. 9,572,402.

(60) Provisional application No. 61/088,330, filed on Aug. 12, 2008, provisional application No. 60/982,047, filed on Oct. 23, 2007.

(51) Int. Cl.
| | | |
|---|---|---|
| *A43B 1/00* | (2006.01) | |
| *A43D 1/02* | (2006.01) | |
| *B29D 35/12* | (2010.01) | |
| *A43B 23/02* | (2006.01) | |
| *B33Y 80/00* | (2015.01) | |
| *B29L 31/50* | (2006.01) | |

(52) U.S. Cl.
CPC ............ *A43D 1/025* (2013.01); *B29C 64/153* (2017.08); *B29D 35/126* (2013.01); *B29L 2031/50* (2013.01); *B33Y 80/00* (2014.12)

(58) Field of Classification Search
CPC ... A43B 13/20; A43B 23/027; A43B 23/0275; A43B 23/02; A43B 13/12; A43D 1/025; A43D 999/00; B29D 35/126; B29C 67/0077; B29C 64/153; B29C 37/00; B33Y 80/00; B33Y 30/00; B29L 2031/50; B31D 5/0039; G06T 17/00
USPC ......... 12/142 P, 146 B, 146 C, 142 R; 36/28, 36/29, 35 B, 45, 30 R
See application file for complete search history.

(56) References Cited

U.S. PATENT DOCUMENTS

| | | |
|---|---|---|
| 2,288,388 A | 6/1942 | Bolten et al. |
| 3,107,284 A | 10/1963 | Dixon et al. |
| 3,256,621 A | 6/1966 | Linton |
| 3,921,313 A | 11/1975 | Mahide et al. |
| 4,134,955 A | 1/1979 | Hanrahan, Jr. et al. |
| 4,168,341 A | 9/1979 | Siedenstrang et al. |
| 4,219,945 A | 9/1980 | Rudy |
| D273,246 S | 4/1984 | Tonkel |
| 4,542,130 A | 9/1985 | Weissmuller et al. |
| 4,551,930 A | 11/1985 | Graham et al. |
| 4,598,487 A | 7/1986 | Misevich |
| 4,769,927 A | 9/1988 | Liggett et al. |
| 4,845,863 A | 7/1989 | Yung-Mao |
| 4,863,538 A | 9/1989 | Deckard |
| 4,938,816 A | 7/1990 | Beaman et al. |
| 4,968,816 A | 11/1990 | Imaki et al. |
| 5,156,697 A | 10/1992 | Bourell et al. |
| 5,233,767 A | 8/1993 | Kramer |
| 5,313,717 A | 5/1994 | Allen et al. |
| 5,348,693 A | 9/1994 | Taylor et al. |
| 5,367,791 A | 11/1994 | Gross et al. |
| 5,372,487 A | 12/1994 | Pekar |
| 5,408,761 A | 4/1995 | Gazzano |
| 5,421,050 A | 6/1995 | Laganas |
| 5,465,509 A | 11/1995 | Fuerst et al. |
| 5,511,323 A | 4/1996 | Dahlgren |
| 5,588,900 A | 12/1996 | Urakami |
| 5,619,809 A | 4/1997 | Sessa |
| 5,661,864 A | 9/1997 | Valiant et al. |
| 5,678,329 A | 10/1997 | Griffin et al. |
| 5,682,685 A | 11/1997 | Terlizzi |
| 5,686,167 A | 11/1997 | Rudy |
| 5,718,063 A | 2/1998 | Yamashita et al. |
| 5,771,610 A | 6/1998 | McDonald |
| 5,785,909 A | 7/1998 | Chang et al. |
| 5,876,767 A | 3/1999 | Mattes et al. |
| 5,908,569 A | 6/1999 | Wilkening et al. |
| 5,918,383 A | 7/1999 | Chee |
| 5,979,078 A | 11/1999 | McLaughlin |
| 5,987,780 A | 11/1999 | Lyden et al. |
| 5,987,781 A | 11/1999 | Pavesi et al. |
| 6,006,412 A | 12/1999 | Bergmann et al. |
| 6,029,376 A | 2/2000 | Cass |
| 6,061,929 A | 5/2000 | Ritter |
| 6,098,313 A | 8/2000 | Skaja |
| 6,108,943 A | 8/2000 | Hudson et al. |
| 6,110,411 A | 8/2000 | Clausen et al. |
| 6,180,943 B1 | 1/2001 | Lange |
| 6,193,923 B1 | 2/2001 | Leyden et al. |
| 6,195,914 B1 | 3/2001 | Otis |
| 6,259,962 B1 | 7/2001 | Gothait |
| 6,338,768 B1 | 1/2002 | Chi |
| 6,360,454 B1 | 3/2002 | Dachgruber et al. |
| 6,412,196 B1 | 7/2002 | Gross |
| 6,476,122 B1 | 11/2002 | Leyden |
| 6,533,885 B2 | 3/2003 | Davis et al. |
| 6,540,864 B1 | 4/2003 | Chi |
| 6,558,784 B1 | 5/2003 | Norton et al. |
| 6,589,471 B1 | 7/2003 | Khoshnevis |
| 6,589,630 B1 | 7/2003 | Crow |
| 6,601,042 B1 | 7/2003 | Lyden |
| 6,660,209 B2 | 12/2003 | Leyden et al. |
| 6,694,207 B2 | 2/2004 | Darrah et al. |
| 6,819,966 B1 | 11/2004 | Haeberli |
| 6,931,764 B2 | 8/2005 | Swigart et al. |
| 6,944,975 B2 | 9/2005 | Safdeye et al. |
| 6,971,193 B1 | 12/2005 | Potter et al. |
| 6,994,913 B1 | 2/2006 | Niki et al. |
| 7,065,820 B2 | 6/2006 | Meschter |
| 7,077,638 B2 | 7/2006 | Leyden et al. |
| 7,080,467 B2 | 7/2006 | Marvin et al. |
| RE39,354 E | 10/2006 | Dickens, Jr. et al. |
| 7,148,266 B2 | 12/2006 | Nesbitt et al. |
| 7,148,286 B2 | 12/2006 | Baumann et al. |
| 7,171,765 B2 | 2/2007 | Lo |
| 7,200,955 B2 | 4/2007 | Foxen |
| 7,236,166 B2 | 6/2007 | Zinniel et al. |
| 7,291,002 B2 | 11/2007 | Russell et al. |
| 7,350,321 B2 | 4/2008 | Soon et al. |
| 7,398,608 B2 | 7/2008 | Schoenborn |
| 7,424,783 B2 | 9/2008 | Meschter et al. |
| 7,467,484 B2 | 12/2008 | Chang et al. |
| 7,636,974 B2 | 12/2009 | Meschter et al. |
| 7,779,558 B2 | 8/2010 | Nishiwaki et al. |
| 8,914,998 B2 | 12/2014 | Gheorghian et al. |
| 9,504,289 B2 | 11/2016 | Dojan et al. |
| 9,510,635 B2 | 12/2016 | Dojan et al. |
| 2001/0032399 A1 | 10/2001 | Litchfield et al. |
| 2001/0036516 A1 | 11/2001 | Schmidt |
| 2002/0023306 A1 | 2/2002 | Sajedi et al. |
| 2003/0009919 A1 | 1/2003 | Stein |
| 2003/0051372 A1 | 3/2003 | Lyden |
| 2003/0069807 A1 | 4/2003 | Lyden |
| 2003/0127436 A1 | 7/2003 | Darrah et al. |
| 2003/0172548 A1 | 9/2003 | Fuerst |
| 2003/0183324 A1 | 10/2003 | Tawney |
| 2003/0191554 A1 | 10/2003 | Russell et al. |
| 2003/0233771 A1 | 12/2003 | Soon et al. |
| 2004/0104499 A1 | 6/2004 | Keller |
| 2004/0111920 A1 | 6/2004 | Cretinon |
| 2004/0118018 A1 | 6/2004 | Dua |
| 2004/0134099 A1 | 7/2004 | Jones et al. |
| 2004/0135292 A1 | 7/2004 | Coats et al. |
| 2004/0168329 A1 | 9/2004 | Ishimaru |
| 2004/0221482 A1 | 11/2004 | Berger et al. |
| 2004/0261295 A1 | 12/2004 | Meschter |
| 2005/0000116 A1 | 1/2005 | Snow |
| 2005/0017393 A1 | 1/2005 | Stockwell et al. |
| 2005/0039346 A1 | 2/2005 | Thomas |
| 2005/0076536 A1 | 4/2005 | Hatfield et al. |
| 2005/0126038 A1 | 6/2005 | Skaja et al. |
| 2005/0151302 A1 | 7/2005 | Latos et al. |
| 2005/0188564 A1 | 9/2005 | Delgorgue et al. |
| 2005/0262739 A1 | 12/2005 | McDonald et al. |
| 2005/0268497 A1 | 12/2005 | Alfaro et al. |

(56) References Cited

U.S. PATENT DOCUMENTS

| | | |
|---|---|---|
| 2005/0282454 A1 | 12/2005 | Meschter et al. |
| 2006/0052892 A1 | 3/2006 | Matsushima et al. |
| 2006/0061012 A1 | 3/2006 | Hatfield et al. |
| 2006/0061613 A1 | 3/2006 | Fienup et al. |
| 2006/0064905 A1 | 3/2006 | Hudson et al. |
| 2006/0065499 A1 | 3/2006 | Smaldone et al. |
| 2006/0070260 A1 | 4/2006 | Cavanagh et al. |
| 2006/0112594 A1 | 6/2006 | Kilgore |
| 2006/0119012 A1 | 6/2006 | Ruatta et al. |
| 2006/0143839 A1 | 7/2006 | Fromme |
| 2006/0155417 A1 | 7/2006 | Cremaschi et al. |
| 2006/0283044 A1 | 12/2006 | Lacey |
| 2007/0016323 A1 | 1/2007 | Fried |
| 2007/0044345 A1 | 3/2007 | Yang |
| 2007/0045891 A1 | 3/2007 | Martinoni et al. |
| 2007/0056188 A1 | 3/2007 | Tsai |
| 2007/0119074 A1 | 5/2007 | Aveni et al. |
| 2007/0163147 A1 | 7/2007 | Cavanagh et al. |
| 2007/0182070 A1 | 8/2007 | Monsheimer et al. |
| 2007/0227041 A1 | 10/2007 | Menghini |
| 2007/0232753 A1 | 10/2007 | Monsheimer et al. |
| 2007/0277401 A1 | 12/2007 | Young-Chul |
| 2008/0155855 A1 | 7/2008 | Klavano |
| 2008/0215176 A1 | 9/2008 | Borovinskih et al. |
| 2008/0250673 A1 | 10/2008 | Andrews et al. |
| 2009/0014424 A1 | 1/2009 | Meschter |
| 2009/0072436 A1 | 3/2009 | Dean |
| 2009/0073162 A1 | 3/2009 | Waatti et al. |
| 2009/0316965 A1 | 12/2009 | Mailling et al. |
| 2011/0252664 A1 | 10/2011 | Jennings |

FOREIGN PATENT DOCUMENTS

| | | |
|---|---|---|
| CN | 11-90560 A | 8/1998 |
| CN | 23-57543 Y | 1/2000 |
| CN | 12-52344 A | 5/2000 |
| CN | 1255887 A | 6/2000 |
| CN | 1304353 A | 7/2001 |
| CN | 1342046 A | 3/2002 |
| CN | 1348731 A | 5/2002 |
| CN | 26-76682 Y | 2/2005 |
| CN | 1638662 A | 7/2005 |
| CN | 1638663 A | 7/2005 |
| CN | 2827065 Y | 10/2006 |
| CN | 1871964 A | 12/2006 |
| CN | 1871965 A | 12/2006 |
| CN | 2857548 Y | 1/2007 |
| CN | 101161151 A | 4/2008 |
| CN | 101388119 A | 3/2009 |
| DE | 202004018209 U1 | 1/2005 |
| DE | 102005023473 A1 | 11/2006 |
| DE | 102006025990 A1 | 12/2006 |
| EP | 1206915 A2 | 5/2002 |
| EP | 1346655 A1 | 9/2003 |
| EP | 1 354 528 A1 | 10/2003 |
| EP | 1354528 A1 | 10/2003 |
| GB | 1375665 A | 11/1974 |
| GB | 2188531 A | 10/1987 |
| GB | 2434541 A | 8/2007 |
| JP | 44-19087 | 8/1969 |
| JP | S56-92503 U | 7/1981 |
| JP | S60180511 U | 11/1985 |
| JP | 02-107304 U | 8/1990 |
| JP | 3-198801 | 8/1991 |
| JP | H04-43109 U | 4/1992 |
| JP | H04-505107 A | 9/1992 |
| JP | 06-005506 U | 1/1994 |
| JP | 07-007766 Y | 3/1995 |
| JP | H07-021336 B2 | 3/1995 |
| JP | 07-030709 U | 6/1995 |
| JP | 3015346 U | 8/1995 |
| JP | 08-197652 | 8/1996 |
| JP | 09-057874 | 3/1997 |
| JP | 09-123315 | 5/1997 |
| JP | 09-277384 A | 10/1997 |
| JP | H10-240964 A | 9/1998 |
| JP | 2000-152801 A | 6/2000 |
| JP | 2002-001827 A | 1/2002 |
| JP | 03-316462 B2 | 8/2002 |
| JP | 2004-042545 A | 2/2004 |
| JP | 2006072837 A | 3/2006 |
| JP | 2006-265545 A | 10/2006 |
| JP | 2006334400 A | 12/2006 |
| JP | 2007-522908 A | 8/2007 |
| JP | 2008-513252 A | 5/2008 |
| JP | 2008-517795 A | 5/2008 |
| JP | 2009-045244 A | 3/2009 |
| KR | 10-1994-0003504 | 3/1994 |
| KR | 20-0412036 Y1 | 3/2006 |
| WO | 2000-0053398 A1 | 9/2000 |
| WO | 2001024575 A2 | 4/2001 |
| WO | 03/082550 A2 | 10/2003 |
| WO | 2004018966 A1 | 3/2004 |
| WO | 2004073416 A1 | 9/2004 |
| WO | 2004092346 A2 | 10/2004 |
| WO | 2005/063071 A2 | 7/2005 |
| WO | 2006-034261 A2 | 3/2006 |
| WO | 2006034012 A2 | 3/2006 |
| WO | 2006038338 A1 | 4/2006 |
| WO | 2006047259 A1 | 5/2006 |
| WO | 2006122832 A2 | 11/2006 |
| WO | 2008010855 A1 | 1/2008 |
| WO | 2009-035831 A1 | 3/2009 |
| WO | 2009055451 A1 | 4/2009 |
| WO | 2009-114715 A2 | 9/2009 |

OTHER PUBLICATIONS

Search Report for European patent application No. 12194207.2 dated Feb. 1, 2013.
Search Report for European patent application No. 12194211.4 dated Feb. 1, 2013.
Search Report for European patent application No. 12194216.3 dated Feb. 1, 2013.
Search Report for European patent application No. 12194279.1 dated Feb. 1, 2013.
Search Report for European patent application No. 12194276.7 dated Feb. 1, 2013.
Search Report for European patent application No. 12194277.5 dated Feb. 1, 2013.
Search Report and Written Opinion for PCT/US2010/030746 dated Jul. 30, 2010.
J.P. Kruth et al. "Consolidation of Polymer Powders by Selective Laser Stintering," 3rd International Conference PMI2008 (2008). Ghent. Belgium, pp. 1-16.
Zhang, Yu, "Mechanical Property of Fused Deposition Parts," Graduate Thesis, Lehigh University, Lehigh Preserve, 2002.
Wohlers, Terry, "The World of Rapid Prototyping," published in the Proceedings of the Fourth International Conference on Desktop Manufacturing, Sep. 24-25, 1992, San Jose, CA, and available at https://wohlersassociates.com/mrhtml.
Major RP Technologies, available at https://uni.edu/~rao/rt.major_tech.htm.
Elkins, Kurt, et al., "Soft Elastomers for Fused Deposition Modeling", Solid Freeform Fabrication Proceedings, Sep. 1997, pp. 441-448 (Year 1997).
Oct. 16, 2018—(EP) ESR—App. No. 18182995.3.
DuraForm Flex plastic, http://www.approto.com/EasyOnline/pds/DS-DuraForm_Flex_plastic.pdf, dated Jun. 1, 2005.
University of the Arts London, http://www.fashion.arts.ac.uk/15144.htm, printed off Internet prior to filing.
Manufacturingtalk, Shoe-Industry specific VISI-Shoes software, http:www.manufacturingtalk.com/news/vea/vea101.html, dated Nov. 18, 2005.
Loughborough University, PhD Studentships, http://www.jobs.ac.uk/jobs/NL338/PhD_Studentships/, dated 2008.
International Search Report for application No. PCT/US2010/030748 dated Jan. 18, 2011.
Webster's New Collegiate Dictionary, G. & C. Merriam Co., 1977, p. 927.

(56) References Cited

OTHER PUBLICATIONS

International Search Report and Written Opinion received in corresponding PCT Application No. PCT/US2010/030746 dated Jul. 30, 2010.

International Search Report and Written Opinion received in corresponding PCT Application No. PCT/US2008/080761 dated Mar. 25, 2009.

News Releases, Reebok Runs With 3D Systems' DuraForm Flex Plastic, http:/www.3dsystems.com/newsevents/newsreleases/pr-Oct 8 2007.asp, printed off internet prior to filing.

Manufacturing Solutions, Target: Plastic Parts, http://www.complexmatters.com/news.htm, printed off internet prior to filing.

Computersight.com, "A 3D Printer Lets You Print Your Shoes at Home", available at http://computersight.com/computers/a-3d-printer-lets-you-print-your-shoes-at-home/, published on-line Dec. 4, 2006, 6 pages.

Z-Corporation, "Z Corporation 3D Printing Technology", available at http://www.zcorp.com/documents/108_3D%20Printing%20White%20Paper%20FINAL.pdf, 2005, 7 pages.

Cadalyst, "On the Job: 3D Printing Gives Footwear Company Leg Up on Competition", available at http://www.zcorp.com/documents/161_2006-0210-Cadalyst-3D%20Printing%20Gives%20Footwear%20Co.%20Leg%20Up%20on%20Competition.pdf, Feb. 10, 2006, 3 pages.

Graham-Rowe, Duncan, "Tailor-printed shoes will offer a perfect fit", New Scientist, Feb. 11, 2006, vol. 189, Issue 2538, p. 30 (3 pages as printed).

Piller, Frank, "Footwear Customization 3.0: The First Rapid Manufactured Shoe", Mass Customization & Open Innovation News, published on-line Oct. 24, 2006 at http://mass-customization.blogs.com/mass_customization_open_i/2006/10/footwear_custom.html, 4 pages.

Footwear Customization 3.0: The First Rapid Manufactured Shoe, Mass Customization & Open Innovation News.

Search Report for European patent application No. 12194198.3 dated Feb. 1, 2013.

Loughborough University, "World's first fully customised football boot accelerated by Rapid Manufacturing experts".

"Custom Made Sports Shoes (Rapid Manufacturing)—YouTube", downloaded from https://www.youtube.com/watch?i=gFSiZgrdCZM.

Mass Customization & Open Innovation News, "Prior 2 Lever: Footwear Customization With Rapid Manufacturing", downloaded from <http://mass-customization.de/2006/04/prior_2_lever_f.html>.

Search Report for European patent application No. 12194201.5 dated Feb. 1, 2013.

Aug. 6, 2020—(EP) ESR—App. No. 20159387.8.

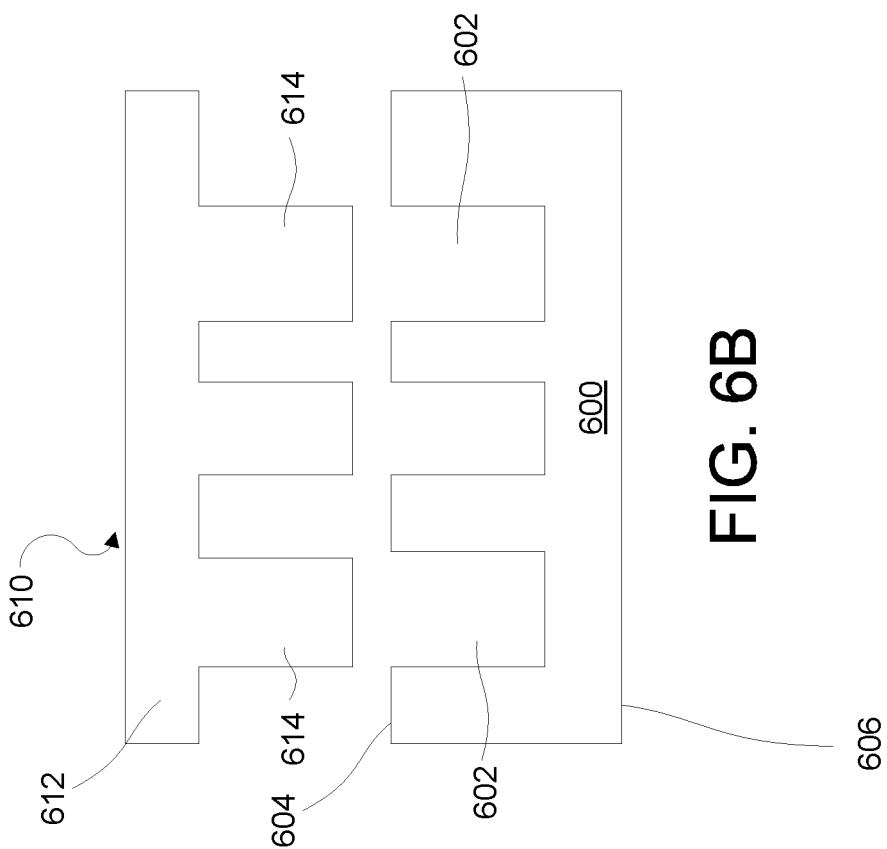
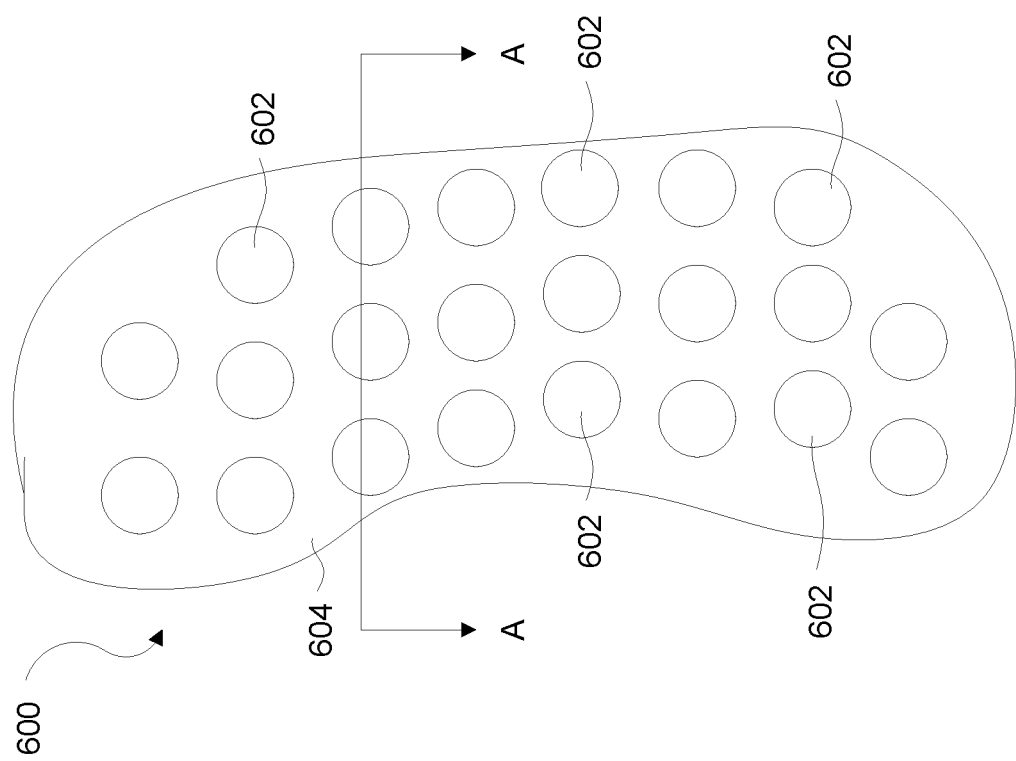
FIG. 6B
FIG. 6A

ARTICLES AND METHODS OF MANUFACTURE OF ARTICLES

CROSS REFERENCE TO RELATED APPLICATIONS

This application is: (a) a continuation of U.S. patent application Ser. No. 13/357,727, filed Jan. 25, 2012, which is (b) a divisional of U.S. patent application Ser. No. 12/433,109, filed Apr. 30, 2009, now U.S. Pat. No. 9,788,603 granted Oct. 17, 2017, which is (c) a continuation-in-part of U.S. patent application Ser. No. 12/255,496, filed Oct. 21, 2008, now U.S. Pat. No. 9,572,402 granted Feb. 21, 2017, which is (d) a non-provisional of U.S. Patent Application No. 60/982,047, filed Oct. 23, 2007, and (e) and a non-provisional of U.S. Patent Application No. 61/088,330, filed Aug. 12, 2008, all entitled "Articles and Methods of Manufacture of Articles." Each of U.S. patent application Ser. No. 13/357,727, U.S. patent application Ser. No. 12/433,109, U.S. patent application Ser. No. 12/255,496, U.S. Patent Application No. 60/982,047, and U.S. Patent Application No. 61/088,330 is incorporated herein by reference in its entirety.

FIELD OF THE INVENTION

This invention relates generally to wearable articles and methods for the manufacture of these articles. More particularly, aspects of this invention relate to articles of footwear, as well as methods of manufacturing these articles using rapid manufacturing technology.

BACKGROUND

Various manufacturing processes exist to form a variety of manufactured articles, such as articles of footwear, apparel, athletic equipment, and the like. For example, a midsole for an article of footwear may be manufactured using one of a number of commonly used molding techniques, such as injection molding, blow molding, compression molding, vacuum molding, and the like. These molding methods often require expensive molding equipment that allows little room for variation in the articles produced from the mold. For instance, any change to the design of the molded article generally would require the creation of a new mold. These manufacturing methods generally required a costly retooling anytime a change was made to the molded article design. In addition, molding processes often result in material waste as some material may be trimmed from the molded article in a post-manufacturing processing step.

In addition, conventional molding and article manufacturing methods often leave little or no ability to customize the article, such as an article of footwear, to the particular needs or desires of the wearer. That is, conventional articles of footwear, apparel, athletic equipment, etc. are often mass produced. While some articles are produced in varying sizes, articles are rarely manufactured to the specifications of one particular user.

Further, articles, such as articles of footwear, have regions prone to wear, such as flex regions, high stress regions, etc. Early wear in these regions can cut short the useful life of the product while other areas of the product continue to be capable of functioning at a high level in the intended manner.

SUMMARY

The following presents a general summary of aspects of the invention in order to provide a basic understanding of the invention and various features of it. This summary is not intended to limit the scope of the invention in any way, but it simply provides a general overview and context for the more detailed description that follows.

Aspects of this invention relate to articles, such as articles of footwear, that include reinforcing regions. The articles of footwear (or portions thereof) may be formed using conventional techniques and materials and/or the articles of footwear (or portions thereof) may be formed using rapid prototyping techniques. The reinforcing regions may be formed as a portion of the shoe during fabrication of the shoe or may be formed separately and connected to the shoe using known means of attachment, such as adhesives, stitching, mechanical fasteners, and the like.

Additional aspects of the invention relate to various midsole impact attenuating configurations that may be formed using one or more rapid manufacturing additive fabrication techniques. For instance, a midsole may include a plurality of apertures that correspond to projections on an insole. The midsole and insole combination provide additional impact attenuation and the arrangement of the apertures and projections may be customized based on the specifications, desires, etc. of the wearer.

BRIEF DESCRIPTION OF THE DRAWINGS

A more complete understanding of the present invention and certain advantages thereof may be acquired by referring to the following detailed description in consideration with the accompanying drawings, in which:

FIGS. 6A and 6B are top and cross section views, respectively, of a midsole impact force attenuation system having corresponding apertures and projections and formed according to aspects of this invention.

Figure 1:
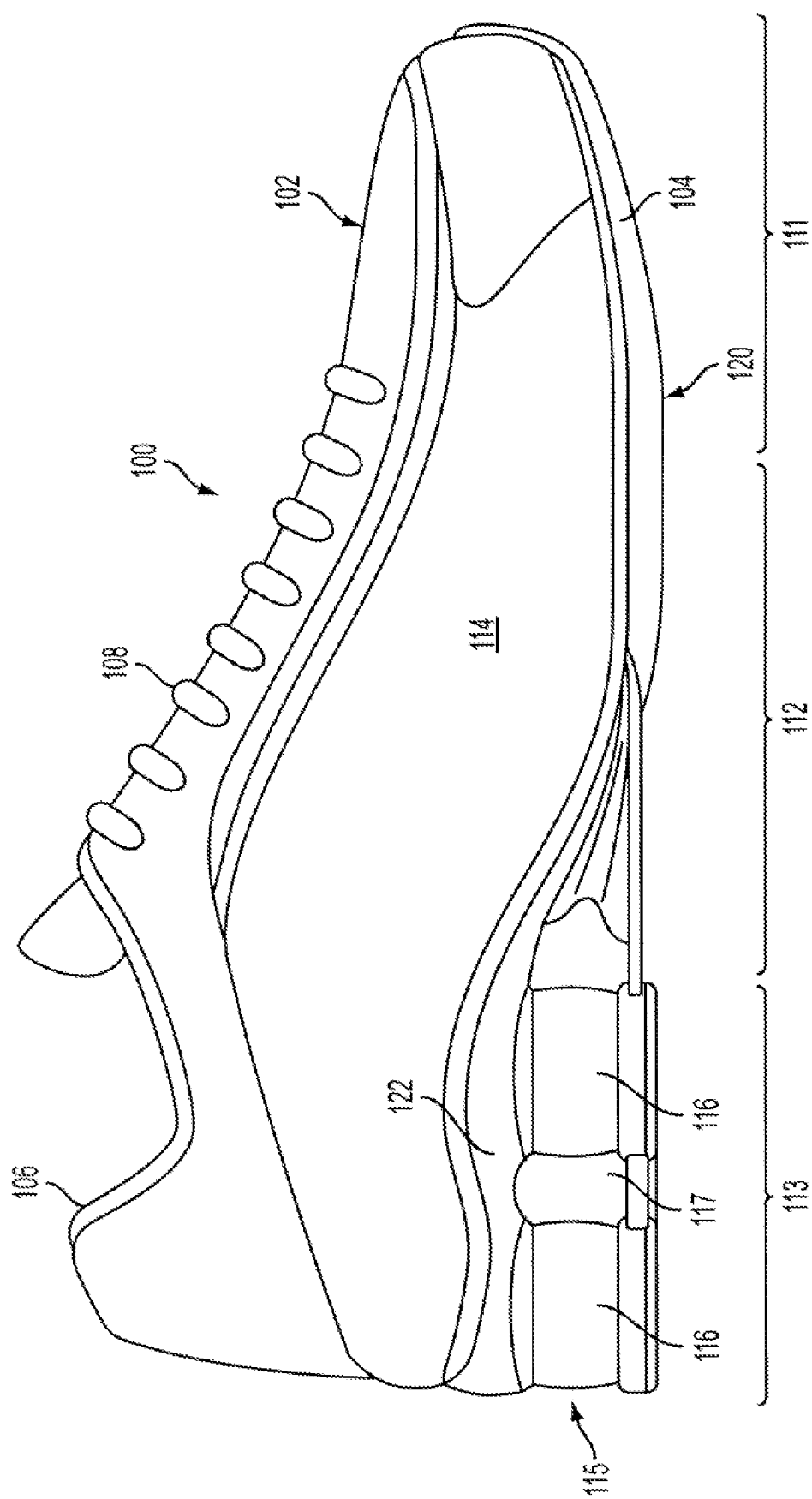
FIG. 1 generally illustrates a side view of an example article of footwear formed according to this invention.

The reader is advised that the attached drawings are not necessarily drawn to scale.

DETAILED DESCRIPTION

In the following description of various example structures in accordance with the invention, reference is made to the accompanying drawings, which form a part hereof, and in which are shown by way of illustration various example articles and methods for manufacturing these articles, such as footwear, watchbands, apparel, athletic equipment, and the like. Additionally, it is to be understood that other specific arrangements of parts and structures may be utilized, and structural and functional modifications may be made without departing from the scope of the present invention. Also, while the terms "top," "bottom," "front," "back," "rear," "side," and the like may be used in this specification to describe various example features and elements of the invention, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this invention. Further, the invention will generally be described in accordance with an article of footwear and method of manufacturing an article of footwear. However, the invention may be used in production of a variety of articles.

A. General Description of Articles and Method for Manufacture of Articles, Such as Footwear, According to Examples of the Invention In general, as described above, aspects of this invention relate to articles, such as footwear, watchbands, articles of apparel, athletic equipment, and the like. In addition, aspects of this invention relate to methods of manufacturing such articles. More detailed descriptions of aspects of this invention follow.

1. Example Articles, Such as Articles of Footwear, According to the Invention

One aspect of this invention relates to articles, such as articles of footwear. Such articles of footwear may include, for example, an upper and a sole structure engaged with the upper. In at least some examples, the upper and/or sole structure may be formed using rapid manufacturing techniques, such as laser sintering, solid deposition modeling, stereolithography, and the like. The upper may include reinforcement portions configured to provide additional durability, wear resistance, etc., in areas of the upper that may be prone to tearing, wear, flex, and the like. The reinforcement portions may be formed of conventional materials and manufacturing processes, for instance, non-rapid manufacturing additive fabrication techniques, or they may be formed using one or more rapid manufacturing additive fabrication techniques. The reinforcement portions may be connected to the upper using known means of attachment, such as stitching, adhesives, and the like.

In other examples, portions of the rapid manufactured upper and/or sole structure of the article of footwear may be formed of different materials to provide different mechanical characteristics to different regions of the shoe. For instance, flexible regions may be formed of a first material having properties associated with flexibility to enable flexing of the shoe, while supportive regions, such as an ankle region, may be formed of a second material having properties associated with stiffness and support. In at least some products in accordance with this invention, the various portions of the shoe may be formed in a single rapid manufacturing process.

In still other examples, portions of the rapid manufactured upper and/or sole structure of the article of footwear may be formed from material fused with varying laser intensities in order to provide different mechanical characteristics to different regions of the shoe. For instance, regions in which greater hardness is desired, such as an eyelet region, may receive a higher intensity laser than regions in which flexibility is desired, such as the toe region. Laser radiation intensity may be varied, for example, by altering the laser power, the laser scanning speed, or the laser beam spot size.

Additional aspects of the articles described above will be described in detail more fully below.

2. Example Methods of Manufacturing Articles, Such as Articles of Footwear, According to the Invention Another aspect of this invention relates to methods of manufacturing articles, such as footwear, and the like. Such methods of manufacturing articles of footwear include forming an upper, forming a sole structure and engaging the upper with the sole structure. In some examples, an upper may be formed using a rapid manufacturing additive fabrication technique. A first portion of the upper may be formed of a first material and a second portion of the upper may be formed of a second material, different from the first material. The first and second portions may be formed in a single rapid manufacturing process. The first material and the second material may provide different mechanical characteristics to the different portions of the article of footwear.

In other examples, a first portion of the upper may be formed using a laser at a first laser intensity, while a second portion of the upper may be formed using a laser at a second laser intensity, the second laser intensity being different from the first laser intensity. As noted above, laser intensity may be varied, for example, by altering the laser power, the laser scanning speed, or the laser beam spot size. The first and second laser intensities may provide different mechanical characteristics to the different portions of the article of footwear.

Specific examples of the invention are described in more detail below. The reader should understand that these specific examples are set forth merely to illustrate examples of the invention, and they should not be construed as limiting the invention.

B. Specific Examples of the Invention

FIG. 1 generally illustrates an example article of footwear 100 formed according to aspects of the invention. The article of footwear 100 includes an upper 102 and a sole structure 104. For purposes of reference in the following material, footwear 100 may be divided into three general regions: a forefoot or toe region 111, a midfoot region 112, and a heel region 113, as illustrated in FIG. 1. In addition, footwear 100 includes two sides: lateral side 114 and medial side (not shown). Lateral side 114 is positioned to extend along the lateral (outside) side of the foot and generally passes through each of regions 111-113. Similarly, the medial side is positioned to extend along an opposite medial (inside) side of the foot and generally passes through each of regions 111-113. Regions 111-113 and medial and lateral sides are not intended to demarcate precise areas of footwear 100. Rather, regions 111-113 and medial and lateral sides are intended to represent general areas of footwear 100 that provide a frame of reference during the following discussion.

Generally, upper 102 is secured to sole structure 104 and defines a cavity for receiving a foot. Access to the cavity is provided by an ankle opening 106 located in heel region 113. A lace 108 extends through various apertures in upper 102. Lace 108 may be utilized in a conventional manner to selectively increase a size of ankle opening 106 and to modify certain dimensions of upper 102, particularly girth, to accommodate feet with varying dimensions. Various materials are suitable for use in manufacturing a conventional upper. Those materials used in conventional uppers include leather, synthetic leather, rubber, textiles, and polymer foams, for example, that are stitched or adhesively bonded together. The specific materials utilized for upper 102 may be selected to impart wear-resistance, flexibility, air-permeability, moisture control, and comfort. In some conventional arrangements, different materials may be incorporated into different areas of upper 102 in order to impart specific properties to those areas. Furthermore, the materials may be layered in order to provide a combination of properties to specific areas. In accordance with aspects of this invention, the upper 102 may be formed using a rapid manufacturing additive fabrication technique from suitable materials, such as a thermoplastic elastomer, and may include various reinforcements formed using conventional methods, as well as by using rapid manufacturing additive fabrication techniques, as will be discussed more fully below.

Sole structure 104 is secured to a lower surface of upper 102 and includes an outsole 120 and a midsole 122. Outsole 120 forms a ground-engaging surface of sole structure 104 and is formed of a durable, wear-resistant material. Conventional sole structures may be formed of rubber that is textured to enhance traction. In accordance with aspects of this invention, the outsole 120 and/or midsole 122 may be formed, using a rapid manufacturing additive fabrication technique, of a thermoplastic elastomer, as will be discussed more fully below. In some embodiments, outsole 120 may be integrally formed with midsole 122 or may be a lower surface of midsole 122. Some conventional midsoles are primarily formed of a polymer foam material, such as polyurethane or ethylvinylacetate, that forms a foam core type impact force attenuation system in the midsole 122. Other conventional midsoles may include a column type midsole impact force attenuation system, such as the one shown in FIG. 1. Additional midsole impact force attenuation types are available for use in conventional midsoles, including an air bag type impact force attenuation system. These various impact force attenuation systems, including column type, foam core, air bag, and the like (or at least portions thereof), may also be manufactured using rapid manufacturing techniques and associated materials in accordance with aspects of this invention, as will be discussed more fully below.

Conventional articles of footwear are generally formed from a variety of different types of materials and a variety of different manufacturing processes. In some arrangements, the upper and sole structure are generally formed as separate pieces and then are joined in a post-manufacture processing step. In forming the upper, a plurality of upper portions may be formed or cut, using conventional methods, and then are connected to each other. The upper portions may be connected by any known means such as stitching, adhesives, mechanical fasteners, and the like. This process often generates a substantial amount of waste associated with trimming each of the individual pieces of the upper to be the correct shape and size for that particular upper or portion of the upper.

In addition to forming articles of footwear using conventional manufacturing techniques, the articles of footwear, or portions thereof, may be formed using rapid manufacturing additive fabrication techniques, such as laser sintering, stereolithography, solid deposition modeling, and the like. Rapid manufacturing fabrication techniques involve creating a three-dimensional design in a data file, such as a Computer Aided Design (CAD) file, and building the object of the three-dimensional design in an automated layer by layer process. Essentially, the fabrication equipment reads the three-dimensional design from the data file and lays down successive layers of powder, liquid or sheet material to build the three dimensional object. The layers are joined together by the fabrication equipment, for instance, a high powered laser may be used, to form the three dimensional object of the design. Such rapid manufacturing techniques are generally known in the art.

One particular process for forming articles that may be used in accordance with aspects described herein is laser sintering. This process involves creating a three-dimensional design in a data file, such as a CAD file. The laser sintering fabrication equipment reads the CAD file and forms the three-dimensional object of the design, such as an upper or portion of an upper for an article of footwear, using a high powered laser to fuse powders or small particles of plastic, metal or ceramic. The laser selectively fuses powdered material by scanning cross-sections generated from a CAD file or a scan of the part on the surface of a powder bed. After each cross-section is scanned, the powder bed is lowered by one layer thickness, a new layer of material is applied on top, and the process is repeated until the part is completed. Laser sintering, and other rapid manufacturing processes are generally known in the art. One example system is found in U.S. Pat. No. 5,156,697 to Bourell et al. and is incorporated herein by reference.

Figure 2:
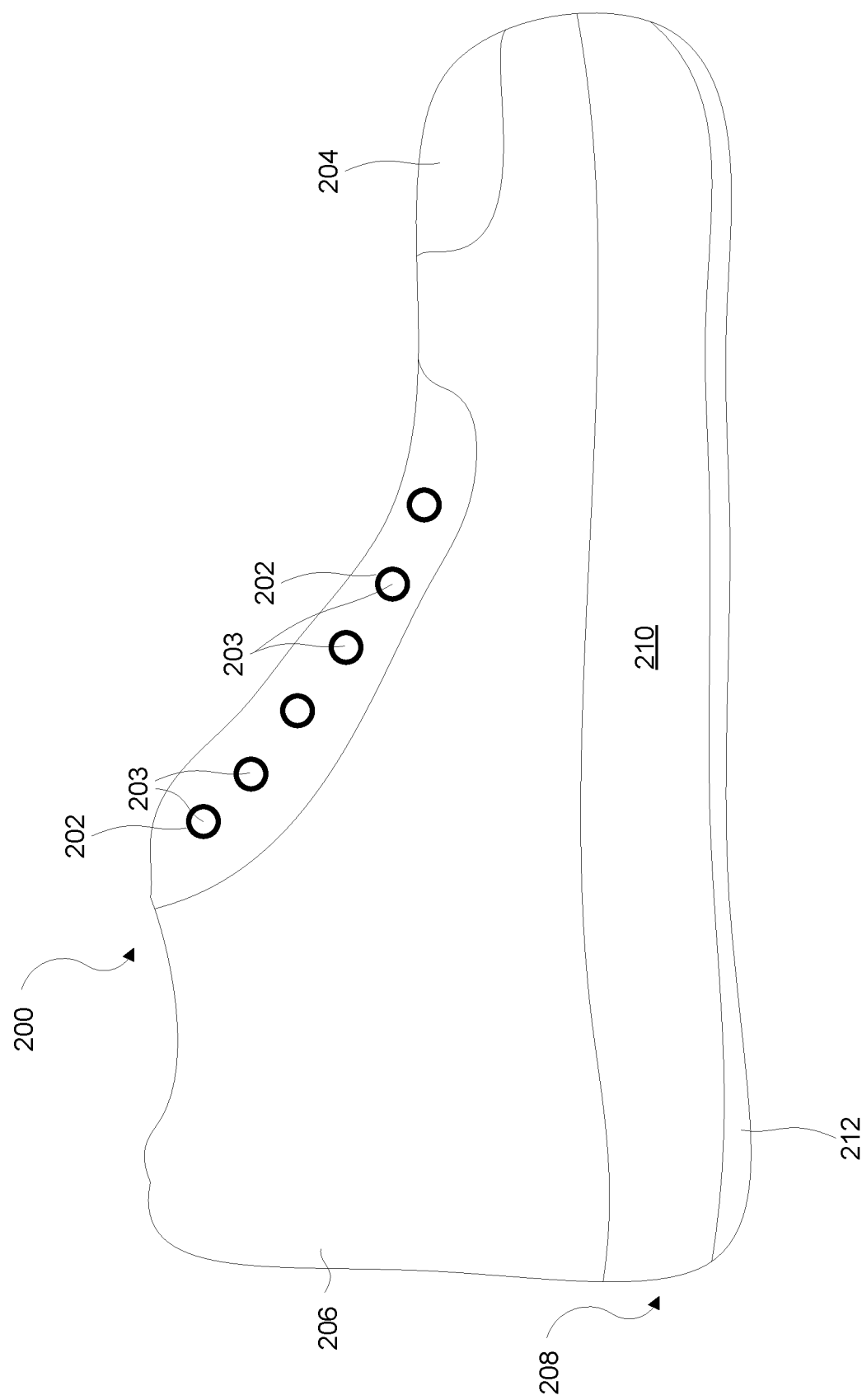
FIG. 2 is a side view of an example article of footwear having reinforced regions formed according to aspects of this invention.

Articles of footwear formed using rapid manufacturing additive fabrication techniques, and some formed using conventional methods, often require reinforcement at areas that experience flexing or heavy wear or stress. Accordingly, reinforcement portions may be formed to prolong the usable life of the article of footwear by reinforcing the region prone to weakening, tearing, etc. For instance, FIG. 2 illustrates one example article of footwear 200 including reinforcement portions 202, 204. As shown, the article of footwear 200 generally includes an upper 206 forming a void for receiving a foot of a wearer. In addition, the shoe 200 includes a sole structure 208 that may include a midsole 210 and an outsole 212. In some examples, the sole structure 208 may be formed using conventional methods, such as molding, etc. In other arrangements, the sole structure 208 may be formed using one or more rapid manufacturing additive fabrication techniques. Forming the sole structure 208 using rapid manufacturing techniques may permit complex shapes to be formed, some of which may be impossible to form using conventional manufacturing techniques. Also, forming the sole structure 208 using rapid manufacturing techniques may better allow for customization of the sole structure 208, because the foot of a wearer may be scanned and the sole structure 208 may be manufactured based on the scan of the wearer's foot.

The upper 206 may also be formed using conventional manufacturing techniques or rapid manufacturing additive fabrication techniques. The article of footwear 200 of FIG. 2 also includes a plurality of eyelets 203. In some arrangements, the upper 206 formed using rapid manufacturing techniques may benefit from reinforcement of the eyelet regions of the article 200. Accordingly, eyelet reinforcement portions 202 may be formed and connected to the upper 206 using known means of attachment, such as stitching, adhesives, mechanical fasteners, and the like. For instance, eyelet reinforcement 202 may be formed using rapid manufacturing techniques and connected to the eyelet region 203 of the upper 206 in order to reinforce the eyelets 203 to accommodate a lace or other closure system (not shown). In another example, the eyelets reinforcements 202 may be formed from conventional material (e.g., plastic, metal, leather, textile, etc.) and/or from conventional manufacturing techniques such as molding, extrusion, etc. The eyelet reinforcements 202 may then be connected to the eyelets 203 formed in the upper 206 as a post-manufacturing processing step using known means of attachment, such as stitching, adhesives, mechanical fasteners, crimped metal ring structures, and the like.

The article of footwear 200 of FIG. 2 also includes a reinforcement 204 configured at a toe region of the article of footwear 200. In some arrangements, the toe region may be considered a high wear region due to a wearer's toe pushing on the inner side of the toe region during use. Accordingly, a regional reinforcement structure, such as reinforcement 204, may be positioned in that region to aid in preventing holes, tearing, etc. The toe region reinforcement 204 may be formed from conventional materials, such as textile, leather, and the like, or it may be formed using a rapid manufacturing additive fabrication technique and associated materials. Using a rapid manufacturing technique to form the reinforcement 204 may permit variations in the thickness of the reinforcement in various regions of the reinforcement. For instance, the reinforcement may be thinner at the rear of the toe region (i.e., closer to the midfoot region of the shoe) rather than at the front of the toe region to provide additional support at the front of the shoe.

Further, the shape, size, thickness, etc. of the reinforcement 204 may be customized for a particular wearer. That is, the gait or step cycle and characteristics of the wearer may be studied in order to determine where additional reinforcement may be needed and the reinforcement 204 may be constructed to those specifications using one or more rapid manufacturing additive fabrication techniques or, in some arrangements, conventional manufacturing techniques. As one more specific example, for persons that tend to over-pronate during their steps, additional stiffness and/or wear reinforcement may be provided in the lateral heel area of the sole.

The toe region reinforcement 204 may be connected to the upper 206 using known means of attachment, such as adhesives, stitching, mechanical fasteners, mating snap fit components on the reinforcement and the upper, and the like.

Figure 3:
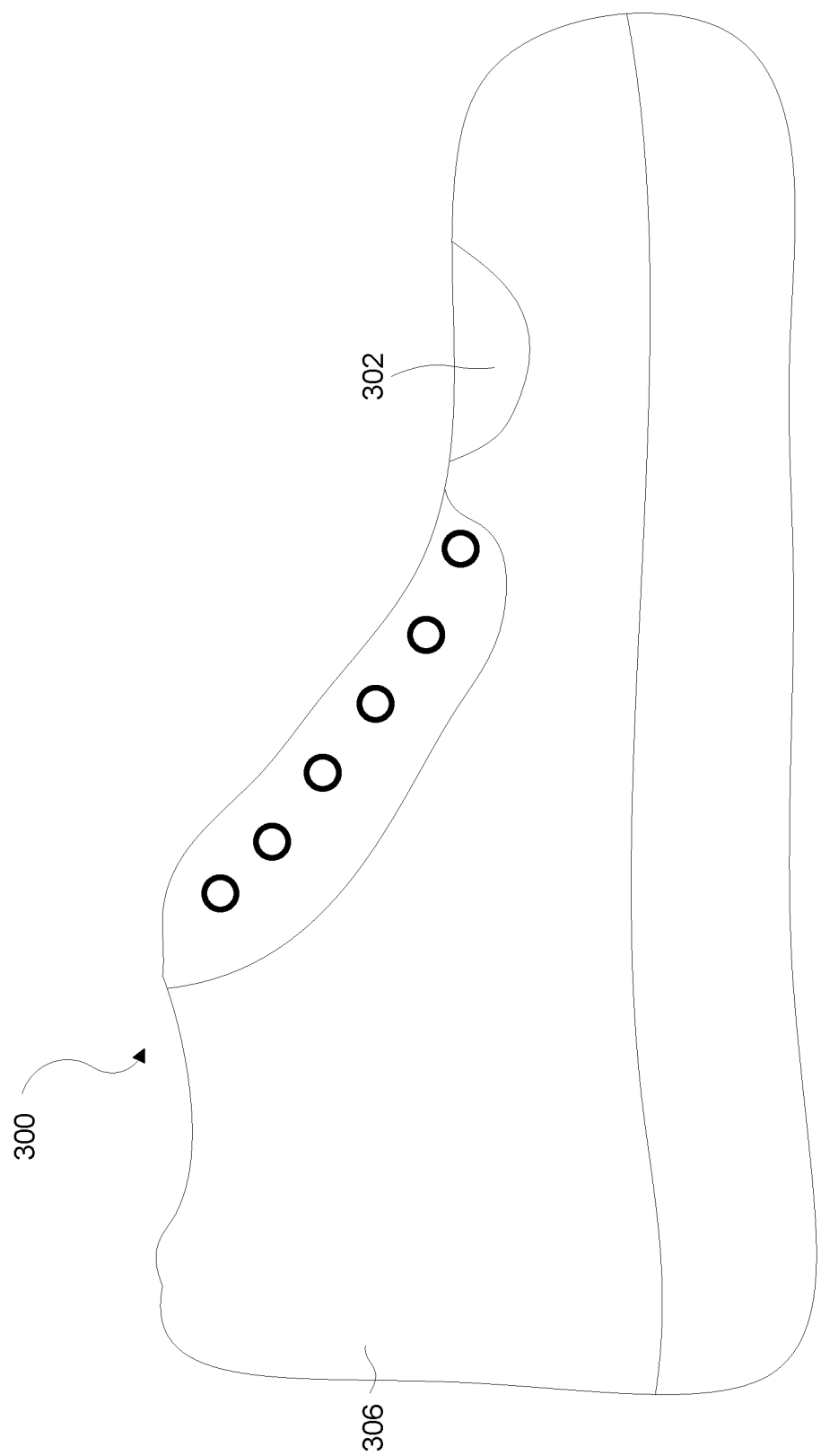
FIG. 3 is a side view of another example article of footwear having reinforced regions formed according to aspects of this invention.

Additionally or alternatively, the vamp forefoot region includes a flex region that may also benefit from reinforcement. For instance, FIG. 3 illustrates an article of footwear 300 having a reinforcement 302 extending along this flex region of the upper 306. The reinforcement 302 may be formed of conventional materials and/or conventional manufacturing techniques, or may be formed using a rapid manufacturing additive fabrication technique and associated materials. The reinforcement 302 may be formed as part of the initial rapid manufacturing process to fabricate the article of footwear 300, or it may be formed as a separate piece that may be connected or attached to the upper 306 using known means of attachment, such as adhesives, stitching, mechanical fasteners, mating snap fit components on the reinforcement and the upper, and the like. The reinforcement 302 may be formed to permit flexing of the article of footwear 300 in that region, while providing additional durability and wear resistance in the high stress area of the shoe 300 (for example, when jumping, crouching, etc.).

Figure 4:
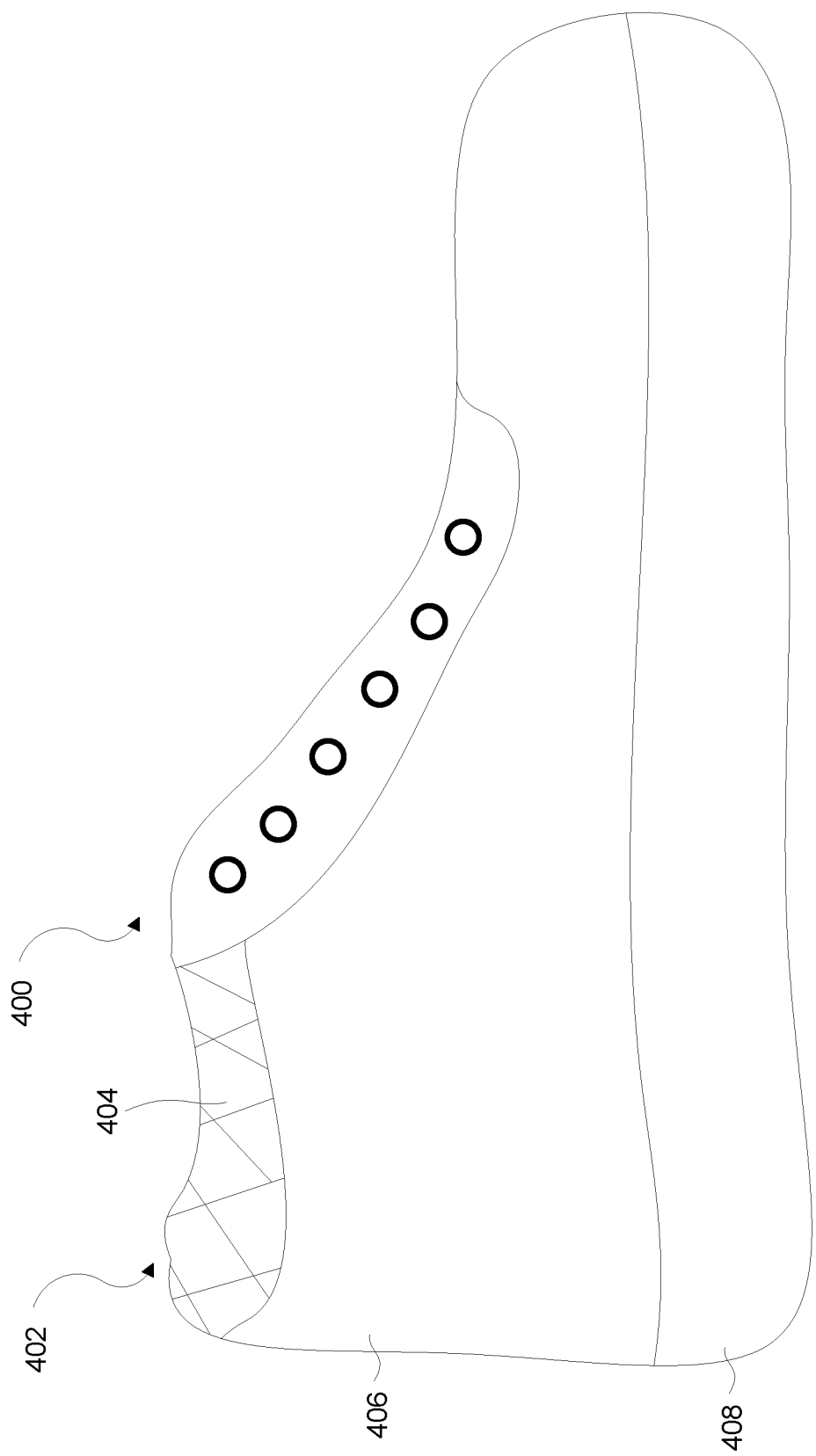
FIG. 4 is a side view of still another example article of footwear having reinforced regions formed according to aspects of this invention.

FIG. 4 illustrates yet another article of footwear 400 having a reinforced region 402. As with the arrangements above, the upper 406 and sole structure 408 of the article of footwear 400 may be formed using conventional materials and conventional manufacturing techniques, or they may be formed using one or more rapid manufacturing additive fabrication techniques and associated materials. However, the collar region 402 of the article of footwear 400 is often a region that receives heavy wear and may be likely to tear, wear down, etc. Accordingly, reinforcement in the collar region 402 may prolong the usable life of the shoe 400.

In some arrangements, the upper 406 of an article of footwear 400 may be formed using one or more rapid manufacturing additive fabrication techniques. A collar reinforcement 404 may be formed separately (either from conventional materials and processes or rapid manufacturing materials and processes) and connected to the upper 406 to provide additional wear resistance. Additionally, because the collar region 402 may be an area that can rub and cause irritation on the wearer's skin, the collar reinforcement 404 also may include a soft foam, fabric, or other comfort-enhancing material. The collar reinforcement 404 may be attached to the upper 406 using known means of attachment including stitching, adhesives, mechanical fasteners, and the like. In some arrangements, the collar reinforcement 404 may include a snap fit mechanism that mates with a corresponding snap fit mechanism configured in the collar region 402 of the upper 406.

In addition to providing added strength, wear resistance, comfort, etc., the reinforcements described above may also add various design elements to the article of footwear. For instance, the reinforcements may include one or more colors or color schemes to complement the color or colors used in the upper or other portions of the shoe. Additionally or alternatively, the reinforcements may be shaped to provide a complimentary design element to the shoe structure. In some arrangements, the reinforcements may be shaped to include a logo (such as a team logo, mascot, etc.) or a company trademark. In some arrangements, the properties of one region may transition into the properties of another region.

Frther, resin (colored or uncolored) may be brushed, painted, sprayed, etc. onto various regions of an article of footwear formed using rapid manufacturing techniques to provide additional aesthetic enhancement, as well as additional durability to regions of high wear and/or stress. The resin may be brushed onto the shoe after the shoe has been formed, as a post-fabrication processing step. The process may include resins of varying colors, etc. in order to enhance the appearance of the shoe while providing added durability to various regions of the shoe or to the entire shoe, as desired. Various resins that may be used and techniques for applying the resin are discussed more fully in U.S. patent application Ser. No. 12/255,496, entitled "Articles and Methods of Manufacture of Articles" to which this application claims priority and which is incorporated herein by reference in its entirety.

In addition to the reinforcement portions and techniques described above, an article of footwear may be formed using more than one material during a rapid manufacturing additive fabrication process. For instance, the article of footwear may be formed from a single design file including the design, specifications, etc. of the shoe. During rapid manufacturing of the shoe, using a single type of rapid manufacturing process, multiple materials may be used to provide different characteristics or properties to different regions of the shoe.

Figure 5:
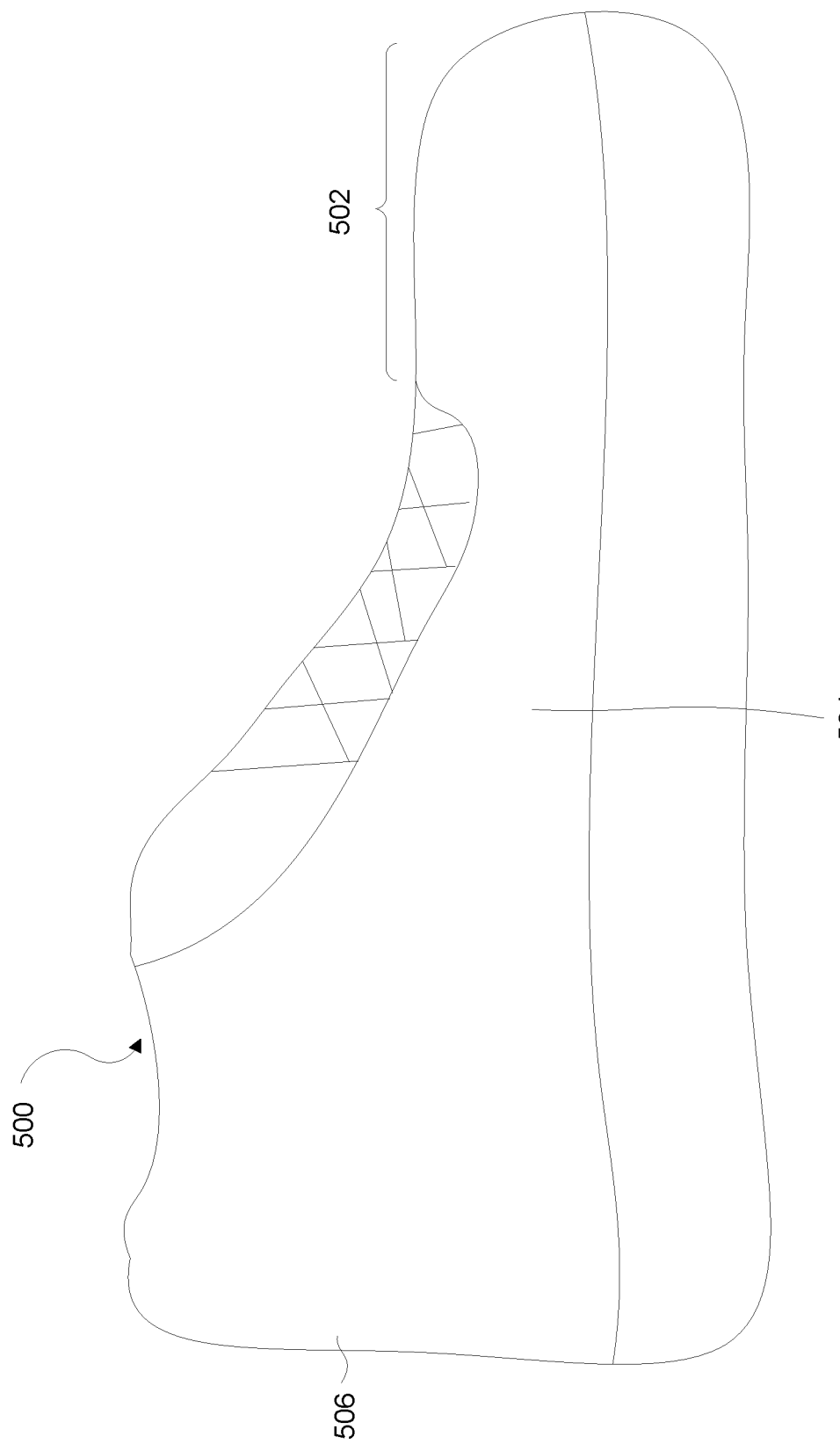
FIG. 5 is a side view of example article of footwear, portions of the article of footwear being formed from different materials according to aspects of this invention.

For instance, the article of footwear 500 in FIG. 5 may be formed using one or more rapid manufacturing additive fabrication techniques. The layer-by-layer process used to fabricate the shoe 500 may include different materials for different regions of the shoe 500. For instance, additional flexibility may be desired in a toe region 502 of the shoe 500, while additional stiffness may be desired in the lateral side 504 and medial side (not shown) of the upper 506 being formed. Materials providing these differing properties may be used in the same rapid manufacturing additive fabrication technique. For instance, a layer of the powder being fused may include a first material in one area or portion of the article and a second material, different from the first material, in another area or portion of the article. Accordingly, two or more different materials may be used to form, from a single rapid manufacturing process, the shoe 500 having the desired properties. In some examples, portions of the article of footwear may be formed using a thermoplastic elastomer, such as DuraForm Flex plastic manufactured and sold by 3D Systems, or other similar materials, such as manufactured by Advanced Laser Materials, LLC (e.g., ALM Flex) and Evonik Industries (e.g., Evonik Soft Touch), various powders, any generally plastic-like material, and the like.

In still other arrangements, the rapid manufacturing additive fabrication technique used to manufacturing the article may include a laser having varying intensities, such that higher or lower intensities may be used when forming various regions of the article of footwear. For instance, with further reference to FIG. 5, the toe region 502 may be fused using a laser of lower intensity in order to maintain the flexibility of the material in that region. However, a higher intensity laser may be used to fuse the material of the lateral side 504 and medial side of the upper 506 in order to provide additional stiffness and support in those regions. This arrangement using lasers of varying intensities in different regions of the foot may be performed using various known rapid manufacturing additive fabrication techniques. Further, various lasers may be used to manufacture the articles. In some arrangements, a 50 watt carbon dioxide DEOS Class IV laser may be used.

In other arrangements, regions in which additional hardening would be desired, such as the eyelet region (203 of FIG. 2), may be fused with a higher intensity laser than other regions of the shoe. This may aid in reinforcing the eyelet region of the article.

Varying the intensity of the laser may permit further customization of the article of footwear. For instance, varying the intensity of the laser used in fabricating various regions of the shoe may alter the density, stiffness, etc. of the shoe such that the article being formed may be "tuned" to desired specifications. These specifications may be unique to one or more identified users. This arrangement provides the ability to alter the properties of the article for each shoe fabricated, if desired, without requiring costly molds to be manufactured in order to produce the articles.

FIGS. 6A and 6B illustrate yet another arrangement of a portion of an article of footwear that may be formed using one or more rapid manufacturing additive fabrication techniques. FIG. 6A illustrates a top view of a midsole 600 of an article of footwear. The midsole 600 generally includes a plurality of apertures 602 distributed throughout a top surface 604. The apertures 602 may extend through a portion of the midsole 600 or may extend completely through the midsole 600 from the top surface 604 to a bottom surface 606. FIG. 6B is a cross section of the midsole 600 of FIG. 6A taken along line A-A. The figure illustrates one example in which the apertures 602 extend partially through the midsole 600. The midsole 600 may be formed using one or more rapid manufacturing additive fabrication techniques. Using these techniques will allow any number, shape, arrangement, size, etc. of apertures to be formed in the midsole 600. For instance, larger or smaller apertures may be formed, apertures of varying shapes including square, rectangular, triangular, trapezoidal, hexagonal, etc. may be formed, the pattern of apertures may vary depending on the region of the midsole, etc.

FIG. 6B further includes an insole member 610. The insole member 610 includes a base 612 and a plurality of projections 614. The projections 614 are formed of a shape and size to correspond to the apertures 602 formed in the midsole 600. The insole member 610 and projections 614 may provide additional impact attenuation, support, comfort, etc. for the wearer. The insole member 610 may be formed using a rapid manufacturing additive fabrication technique or by conventional techniques.

In some arrangements, the size, arrangement, etc. of the apertures 602 and corresponding projections 614 may be customized to a particular user. For instance, a scan of a wearer's foot may be taken and additional impact attenuation may be provided in various regions based on the results of the scan.

Figure 7:
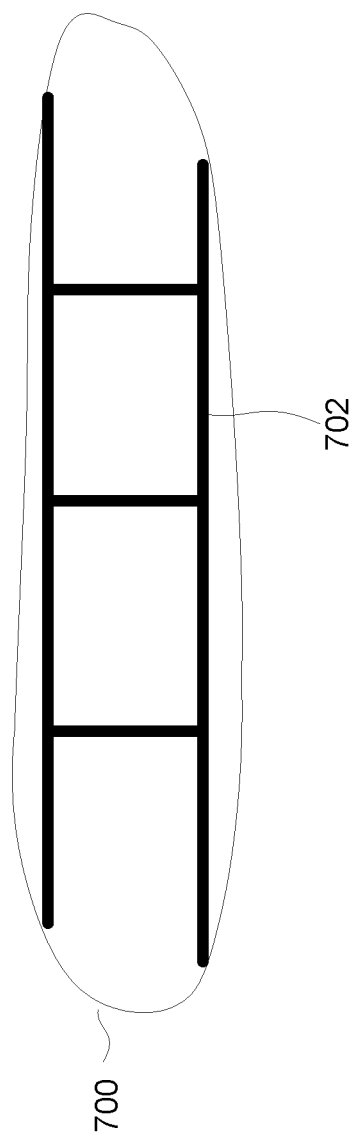
FIG. 7 is an example airbag impact attenuating system formed according to aspects of this invention.

In still other arrangements, rapid manufacturing additive fabrication techniques may be used to form inserts for airbags to be used in midsole impact attenuation systems. For instance, a midsole may include an inflated airbag formed of conventional materials. The airbag may include an insert to aid in maintaining the desired shape of the airbag. For instance, the insert may be attached to the airbag at various locations in the bag interior to help control the shape of the airbag when it is inflated. The use of rapid manufacturing to fabricate the insert allows the insert to be customized to the needs and/or desires of the wearer, as well as to any desired size, shape, etc. in order to maintain the desired shape of the airbag. FIG. 7 illustrates one example airbag 700 including an insert 702 formed using one or more rapid manufacturing additive fabrication techniques. The insert 702 may be sized, shaped, configured, etc. based on a user's desires, specifications based on features of a user's foot, etc.

In still other arrangements, one or more structures arranged in the midsole to hold or fasten the airbag in place may be formed using one or more rapid manufacturing additive fabrication techniques. For example, brackets, clips, grooves, frames, pockets, or other structures for securing the airbag that may be difficult or impossible to manufacture using conventional methods of manufacture may be formed using rapid manufacturing.

In still other arrangements, various parts may be manufactured using rapid fabrication additive techniques inside of other parts formed from the same process. For instance, a small part may be manufactured inside a hollow cavity in a larger part to save time and materials. This process would be similar to Russian dolls with smaller dolls nesting inside larger ones. The CAD file created may include the design for the small part and the larger part and the part may be manufactured in one process.

Further still, some articles manufactured using rapid fabrication additive techniques may be formed in a collapsed condition in order to conserve space. For instance, similar to a paper bag that is stored collapsed along various creases and fold lines, the articles may be formed using rapid manufacturing in a collapsed condition then expanded upon use.

For example, an article of footwear may be formed of a plurality of interlocking rings. The rings may vary in size in different regions of the article of footwear or may be the same size throughout. During manufacture of the article, the rings may be formed in a collapsed condition. That is, the rings may be formed in a stacked formation to produce an article having a very compact shape. However, the rings may be expanded upon opening or expansion of the article to provide the article in an expanded and/or usable condition.

Although the above arrangements have been described for use in manufacturing articles of footwear, aspects of the invention may be used with a variety of articles including apparel, athletic equipment, such as hockey sticks, shin guards, lacrosse sticks, shoulder pads, helmets, shoulder straps, etc., watch bands, jewelry, eye glasses, and the like.

The arrangements described above allow for customization of articles based on a user's specification, desires, etc. In addition, the use of rapid manufacturing fabrication techniques to form various articles minimizes material waste associated with manufacturing the article. When manufacturing conventional articles, material is often trimmed from the article in order to obtain the desired size or shape of the article. In the method described herein, the three-dimensional design file can be created having the particular desired dimensions of the article. The article is then built to those particular dimensions. No additional material is created that may need to be removed to obtain the desired size and shape of the article.

CONCLUSION

While the invention has been described in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

I claim:

1. A method of manufacturing an article of footwear, comprising:
    forming a first portion of an upper by depositing successive layers of a thermoplastic material via a solid deposition modeling fabrication technique;
    providing a second portion of the upper as a separate piece from the first portion, the second portion comprising a second material that is different from the thermoplastic material;
    attaching the second portion of the upper to the first portion of the upper at a vamp forefoot region of the upper;
    providing a sole structure; and
    connecting the sole structure to the upper, wherein the sole structure includes a midsole and an outsole.

2. The method of claim 1, wherein the midsole comprises a polymer foam material.

3. The method of claim 2, wherein the polymer foam material comprises either one of polyurethane or ethylvinylacetate.

4. The method of claim 1, wherein the first portion of the upper possesses a first set of mechanical properties, and the second portion of the upper possesses a second set of mechanical properties that are different from the first set of mechanical properties.

5. The method of claim 1, wherein providing the sole structure comprises forming the midsole by depositing successive layers of a thermoplastic material using a rapid manufacturing additive fabrication technique selected from the group consisting of laser sintering, stereolithography, and solid deposition modeling.

6. The method of claim 5, wherein providing the sole structure further comprises:
    scanning a foot of a user;
    creating a data file based on the scanning of the user's foot, the data file including data representing a three-dimensional design for a midsole; and
    forming the midsole based on the data file.

7. The method of claim 1, wherein the second portion of the upper comprises a textile.

8. The method of claim 1, further comprising:
    providing a third upper portion as a separate piece from the first upper portion; and
    attaching the third portion of the upper to the first portion of the upper at a collar region of the upper.

9. The method of claim 8, wherein the third portion of the upper comprises a textile.

10. A method of manufacturing an article of footwear, comprising:
    providing an upper, comprising:
        a first portion comprising a thermoplastic material deposited as multiple successive layers via a solid deposition modeling fabrication technique;
        a second portion coupled with the first portion, the second portion comprising a second material that is different from the thermoplastic material, the second portion having been formed as a separate piece from the first portion; and
        wherein the second portion of the upper is bonded to the first portion of the upper at a vamp forefoot region of the upper;
    providing a sole structure; and
    connecting the sole structure to the upper, wherein the sole structure includes a midsole and an outsole.

11. The method of claim 10, wherein the sole structure comprises a polymer foam material.

12. The method of claim 11, wherein the polymer foam material comprises either one of polyurethane or ethylvinylacetate.

13. The method of claim 10, wherein the first portion of the upper possesses a first set of mechanical properties, and the second portion of the upper possesses a second set of mechanical properties that are different from the first set of mechanical properties.

14. The method of claim 10, wherein the second material comprises a textile.

15. The method of claim 10, wherein the upper further comprises a third portion, wherein the third portion comprises a third material that is different from the thermoplastic material.

16. The method of claim 15, wherein the third portion is coupled with the upper in a collar region of the upper.

17. The method of claim 15, wherein the third portion comprises a textile.

18. A method of manufacturing an article of footwear, comprising:
    forming a first portion of an upper by depositing successive layers of a thermoplastic elastomer material via a solid deposition modeling fabrication technique;
    providing a second portion of the upper as a separate piece from the first portion, wherein the second portion includes plastic, metal, leather, or a textile and forms eyelet reinforcement portions;
    attaching the second portion of the upper to the first portion of the upper;
    providing a sole structure; and
    connecting the sole structure to the upper, wherein the sole structure includes a midsole and an outsole.

19. The method of claim 18, wherein the second portion includes the textile.

20. The method of claim 18, wherein the second portion includes plastic.

21. The method of claim 18, wherein the second portion includes the textile and wherein the step of attaching the second portion of the upper to the first portion of the upper includes attaching the second portion via an adhesive or stitching.

* * * * *